United States Patent [19]

Gaietto et al.

[11] Patent Number: 4,485,126
[45] Date of Patent: Nov. 27, 1984

[54] METHOD OF TREATING WINDING MEANS OF DYNAMOELECTRIC MACHINE CORE

[75] Inventors: Joseph R. Gaietto, Tiffin, Ohio; William J. Smith, Fort Wayne, Ind.

[73] Assignee: General Electric Company, Fort Wayne, Ind.

[21] Appl. No.: 563,765

[22] Filed: Dec. 21, 1983

[51] Int. Cl.³ .................................... H02K 15/00
[52] U.S. Cl. .......................... 427/116; 427/207.1; 427/231; 427/384; 427/385.5
[58] Field of Search .............. 427/116, 207.1, 231, 427/233, 384, 385.5

[56] References Cited

U.S. PATENT DOCUMENTS

| | | | |
|---|---|---|---|
| 2,572,515 | 10/1951 | Poole et al. | 117/43 |
| 2,574,686 | 11/1951 | Brown | 117/43 |
| 3,283,742 | 11/1966 | Fuchs | 427/116 |
| 3,299,304 | 1/1967 | Hull | 29/609 |
| 3,456,615 | 7/1969 | Zander et al. | 118/5 |
| 3,524,429 | 8/1970 | Wilding | 118/620 |
| 3,527,662 | 9/1970 | Elsworth | 117/232 |
| 3,782,325 | 1/1974 | Farnsworth et al. | 118/58 |
| 3,821,846 | 7/1974 | Pleiss et al. | 29/609 |

*Primary Examiner*—Norman Morgenstern
*Assistant Examiner*—Richard Bueker
*Attorney, Agent, or Firm*—Joseph E. Papin

[57] ABSTRACT

A method of treating winding means of a dynamo-electric machine core with a liquid adhesive material. A plurality of winding coils have opposite side turn portions received in slots provided therefor in the core and opposite end turn portions arranged adjacent opposite end faces of the core, respectively. In practicing this method, the core is rotated in one direction, and the liquid adhesive material is dispensed onto the opposite end turn portions of the coils with a greater amount of the liquid adhesive material flowing therefrom generally along one of the opposite side turn portions of the coils into the slots of the core in which the one opposite side turns of the coils are received than along the other of the opposite side turn portions of the coils into the slots in which the opposite side turn portions of the coils are received in response to the rotation of the core in the one direction. The core is reversed to rotate in another direction opposite the one direction, and the dispensing of the liquid adhesive material is continued onto the opposite end turn portions of the coils so as to flow a greater amount of the liquid adhesive material therefrom generally along the other opposite side turn portions of the coils into the slots of the core in which the opposite side turn portions of the coils are received than along the one opposite side turn portions of the coils into the slots of the core in which the opposite side turn portions of the coils are received in response to the rotation of the core in the another direction thereby to generally equalize the liquid adhesive material fill of the slot means of the core.

25 Claims, 11 Drawing Figures

METHOD OF TREATING WINDING MEANS OF DYNAMOELECTRIC MACHINE CORE

CROSS-REFERENCE TO RELATED APPLICATION

This application is related to the commonly assigned application of Eugene C. Bair and Delmar E. Crawford Ser. No. 563,766 filed concurrently herewith entitled "Method Of Treating A Loose Wound Core, Method Of Fabricating A Loose Wound Core, And Method Of Operating Apparatus" which is incorporated herein by reference.

FIELD OF THE INVENTION

This invention relates in general to dynamoelectric machines and in particular to a method of treating winding means of a dynamoelectric machine core.

BACKGROUND OF THE INVENTION

In the past, various and sundry methods were employed to treat the windings of a dynamoelectric machine core, such as a stator or a rotor core for instance, and in some instances also the core itself, with a hardenable or curable liquid resin material or liquid adhesive material. For instance, one typical past stator core had laminations fixedly interconnected in a stack thereof by suitable means, such as welding, bonding, or cleating or the like for instance, and winding means associated with the stator included a plurality of coils having opposite side turn portions received in slots provided therefor in the stator and opposite end turn portions arranged in generally annular groupings thereof adjacent the opposite end faces of the stator. Of course, suitable insulation, such as slot liners or the like for instance, were provided in the stator slots to electrically insulate the opposite side turn portions of the coils from the stator, and suitable winding retaining means, such as slot wedges or the like for instance, were positioned in the stator slots to maintain the opposite side turn portions of the coils against displacement therefrom into the bore of the stator core. In some instances, the opposite end turn portions of the coils were laced or tied with twine in a manner well known to the art. Also in some instances, an insulating sleeve of a suitable material was placed over the lead ends of the winding means which emanated from various slots of the stator adjacent an opposite end face thereof.

In one of the past methods of treating the winding means associated with the above discussed past stator when the laminations thereof were fixedly interconnected together, such as by welding or cleating for instance as previously mentioned, the stator and winding means were baked or preheated to a preselected temperature sufficient to at least preanneal the winding means, and while at an elevated temperature, the stator core and winding means were fully submersed or dipped into a bath of the liquid adhesive material. When later removed from the liquid adhesive material bath, the stator and winding means were transferred to a curing oven to be rebaked or reheated to effect the curing of the liquid adhesive material which had adhered to the stator core and winding means. In some instances, the stator core and winding means may have been redipped and rebaked. Of course, while the cured liquid adhesive material on the opposite end turn portions of the coils may have added some degree of rigidity thereto, it is believed that one of the disadvantageous or undesirable features of such past treatment method was that the stator slots may not have been adequately filled with the liquid adhesive material during the dipping of the stator so that the opposite side turn portions of the coils within the stator slots may not have been adequately saturated or encapsulated by the liquid adhesive material when cured. As a result, it is believed that the strength of the winding means in the stator core may have been impaired and also that the opposite side turn portions of the coils may not have been rigidly contained within the stator slots. Further, it is also believed that another disadvantageous or undesirable feature of the past treatment method may have involved the loss, such as by dripping or the like for instance, of liquid adhesive material from the winding means during the transfer of the stator core and winding means from the liquid adhesive material bath to a curing oven for baking, and it is also believed that such loss of liquid adhesive material may have created voids between the interstices of the opposite end turn portions of the coils serving to weaken them. Still another disadvantageous or undesirable feature of the past treatment method is believed to be that it may have been necessary to wipe excess liquid adhesive material from the opposite end faces and the peripheral or circumferential surface therebetween of the stator core prior to baking the stator and winding means to cure the liquid adhesive material thereon. A still further disadvantageous or undesirable feature of the past treatment method is believed to be that the insulating sleeves on the lead ends of the winding means may have had to be protected against contact with the liquid adhesive material in the bath thereof during the dipping of the stator core and winding means. Still another disadvantageous or undesirable feature of the past treatment methods is believed to be that there may not have been sufficient distribution of the liquid adhesive material throughout the winding means and between the interfaces of the laminations of the core, as well as an evenness of such distribution, so as to deleteriously affect the strength of such core.

In another of the past methods of treating the winding means of the above discussed past stator when the laminations thereof the were bonded together by a bolt-down bonding process, as previously mentioned and as taught for instance in U.S. Pat. No. 3,299,304 issued June 26, 1964 to Bobbie B Hull which is incorporated herein by reference, only the opposite end turns of the coils were dipped in the bath of the liquid adhesive material prior to baking to effect the cure of the liquid adhesive material. It is believed that this past method of treating the winding means of such past bolt-down bonded stator core may have had at least generally the same disadvantageous or undesirable feature as the previously discussed past treating method.

Another typical past stator core of the loose wound type was formed with loosely stacked laminations having the stator slots thereof maintained generally in alignment by the slot liners disposed in the stator slots, and the winding means were associated with this loose lamination stack generally in the same manner as discussed hereinabove. One of the past treating methods for this loose wound stator core involved mounting an aligning mandrel or the like for instance in the bore of the loose lamination stack, and thereafter baking, fully dipping, and then rebaking the loose wound core generally in the same manner as discussed hereinabove. Of course, in this instance, it is believed that for the most part, the liquid adhesive material may have flowed by capillary action from the outer circumferential surface of the stator core between the interfacing laminations of the loose stack thereof so as to bond the laminations and the winding means together when the loose wound core was rebaked to effect the curing of the liquid adhesive material; however, it is also believed that some of the liquid adhesive material may have been transferred from the slots of the stator by capillary action between the interfacing laminations of the loose stack thereof. Nevertheless, it is believed that this past method of treating the loose wound core has at least generally the same disadvantageous or undesirable features as the previously discussed past treating methods.

Still another past method of treating the above discussed loose wound core involved the bolt down bonding process as shown in U.S. Pat. No. 3,821,846 issued July 2, 1974 to Bernard J. Pleiss, Jr. In this past method, a plurality of bolts are extended through bolt holes provided therefor in the loose lamination stack of the loose wound core so as to mount an opposite end face thereof against a bolt-down fixture. Thus, upon torquing of the bolts, the laminations of the loose stack thereof were forced or clamped together by the bolts generally in the vicinity of the bolt hole thereby to establish generally axial compression regions adjacent the bolt holes between the opposite end faces of the stator. When so mounted to the bolt-down fixture, the loose wound core was preheated and then dipped into the bath of the liquid adhesive material to a depth submersing the lamination stack but not one of the opposite end turn portions of the coils adjacent the lead ends thereof. Thus, one opposite end turn portions of the coils adjacent the lead ends thereof were not dipped, but liquid adhesive material was later applied thereto. Since the bore of the stator was mounted on the alignment mandrel, as previously mentioned, it is believed that for the most part the liquid adhesive material may have penetrated by capillary action from the outer circumferential surface of the lamination stack between the interfacing laminations thereof so as to cover the interfacing surfaces thereof without regard to the clamping of the bolts or the axial compression regions established thereby; however, it is also believed that some of the liquid adhesive material may have been transferred from the slots of the stator by capillary action between the interfacing laminations of the stack thereof. Thereafter, the loose wound core mounted to the bolt-down fixture was transferred to a curing oven to be baked and effect the curing of the liquid adhesive material adhering to the lamination stack and the winding means which, as previously mentioned, served to bond them together. Nevertheless, it is believed that this past method of treating the loose wound core has at least generally the same disadvantageous or undesirable features as the previously discussed past treating methods.

In yet another past method of treating the winding means of the above discussed past stator core in which the laminations were fixedly interconnected together, such as by welding, bonding or cleating for instance, as previously mentioned, the stator core was rotated in only one direction with the bore of the stator extending generally horizontally. During the rotation of the stator in only the one direction, the liquid adhesive material was dripped or trickled onto the opposite end turn portions of the coils of the winding means associated with the stator and flowed therefrom generally along the opposite side turn portions of the coils into the stator slots in which the opposite side turn portions of the coils were received. However, one of the disadvantageous or undesirable features of this past treating method is believed to be that because the stator was rotated in only the one direction, some of the slots of the stator were starved, i.e., not adequately filled, with the liquid adhesive material flowed thereinto. For instance, due to the rotation of the stator in only the one direction, it is believed that a greater amount of the liquid adhesive material dripped onto the opposite end turn portions of the coils flowed therefrom generally along one of the opposite side turn portions of the coils into the stator slots in which the one opposite side turn portions of the coils were received while a lesser amount of the liquid adhesive material flowed generally along the other of the opposite side turn portions of the coils into the slots of the stator in which the other opposite side turn portions of the coils were received thereby to starve, in effect, such stator slots in which the other opposite side turn portions of the coils were received of an equal liquid adhesive material fill. In other words, due to the rotation of the stator in only the one direction, it is believed that the dripped liquid adhesive material had a gravitational tendency to flow "downhill" on the opposite end turn portions of the coils, i.e., in the direction of rotation of the stator, and then along the one opposite side turn portions of the coils into the stator slots receiving them, but the liquid adhesive material was at least inhibited with respect to flow "uphill" on the opposite end turn portions of the coils, i.e., against the rotation of the stator in only the one direction; therefore, the stator slots in which the other opposite side turn portions of the coils were received were generally starved of the liquid adhesive material, i.e., received the lesser amount of the liquid adhesive material dripped onto the opposite end turn portions of the coils in response to the rotation of the stator in only the one direction.

SUMMARY OF THE INVENTION

Among the several objects of the present invention may be noted the provision of an improved method of treating winding means of a dynamoelectric machine core with a liquid adhesive material which overcomes the above discussed disadvantageous or undesirable features, as well as others, of the prior art; the provision of such improved method in which a stronger and more uniform bond of the winding means is effected by the liquid adhesive material treatment thereof; the provision of such improved method wherein the liquid adhesive material is dispensed onto opposite end turn portions of the winding means during rotation of the core in both one direction and another direction opposite thereto; the provision of such improved method in which both the opposite end turn portions of the winding means arranged adjacent the opposite end faces of the core and the opposite side turn portions of the winding means received within slot means provided therefor in the stator are generally completely encapsulated by the liquid adhesive material dispensed onto to opposite end turn portions of the winding means; the provision of such improved method in which the liquid adhesive material is generally evenly distributed to all of the slot means of the core thereby to insure generally even and complete filling of the slot means with the liquid adhesive material; and the provision of such improved method in which rotation of the stator in both one direction and another direction opposite thereto when the liquid adhesive material is dispensed onto the opposite end turn portions of the winding means insures the flow therefrom of the liquid adhesive material generally along the opposite side turn portions of the winding means into all of the slot means of the core in which the opposite side turn portions of the winding means are received. These as well as other objects and advantageous features of the present invention will be in part apparent and in part pointed out hereinafter.

In general, a method is provided in one form of the invention for treating winding means of a dynamoelectric machine core with a liquid adhesive material. The core includes a pair of opposite end faces and a plurality of slot means extending between the opposite end faces and intersecting therewith for receiving the winding means, respectively. The winding means includes a plurality of sets of coils, each coil having at least one conductor turn with opposite side turn portions of the coils received in the slot means of the core and with opposite end turn portions of the coils arranged generally adjacent the opposite end faces of the core, respectively. In practicing this method, the core is rotated in one direction. The liquid adhesive material is dispensed onto the opposite end turn portions of the coils, and a greater amount of the liquid adhesive material is flowed from the opposite end turn portions of the coils generally along one of the opposite side turn portions of the coils into the slot means of the core in which the one opposite side turn portions are received than along the other of the opposite side turn portions of the coils into the slot means of the core in which the other opposite side turn portions of the coils are received in response to the rotation of the stator in the one direction. The rotation of the core is reversed to effect the rotation thereof in another direction opposite the one direction. The dispensing of the liquid adhesive material is continued onto the opposite end turn portions of the coils, and a greater amount of the liquid adhesive material is flowed from the opposite end turn portions of the coils generally along the other opposite side turn portions of the coils into the slot means of the core in which the other opposite side turn portions are received than along the one opposite side turn portions of the coils into the slot means of the core in which the one opposite side turn portions of the coils are received in response to the rotation of the core in the another direction thereby to generally equalize the liquid adhesive material fill of the slot means of the core.

BRIEF DESCRIPTION OF THE DRAWINGS

Corresponding reference characters indicate corresponding parts throughout the several views of the drawing.

The exemplifications set out herein illustrate the preferred embodiments of the present invention in one form thereof, and such exemplifications are not to be construed as limiting the scope of the disclosure or of the invention in any manner.

DETAILED DESCRIPTIONS OF THE PREFERRED EMBODIMENTS

Figure 2:
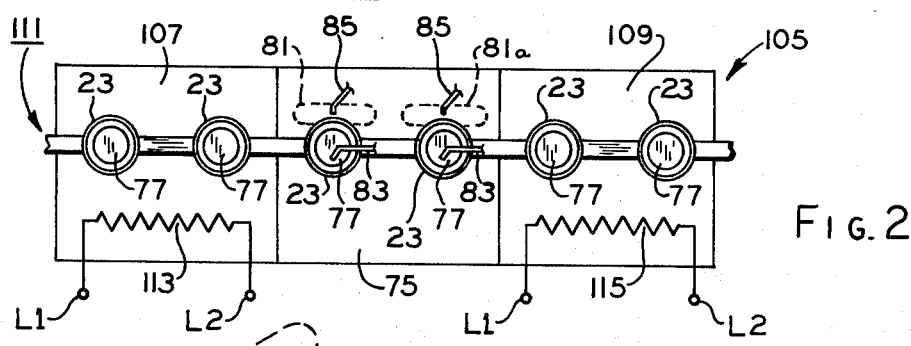
FIG. 2 is a schematic view illustrating an exemplary apparatus in part for practicing the method of FIG. 1 and showing a preheating work station, a liquid adhesive material dispensing work station, and a curing work station of such exemplary apparatus, respectively.
Figure 3:
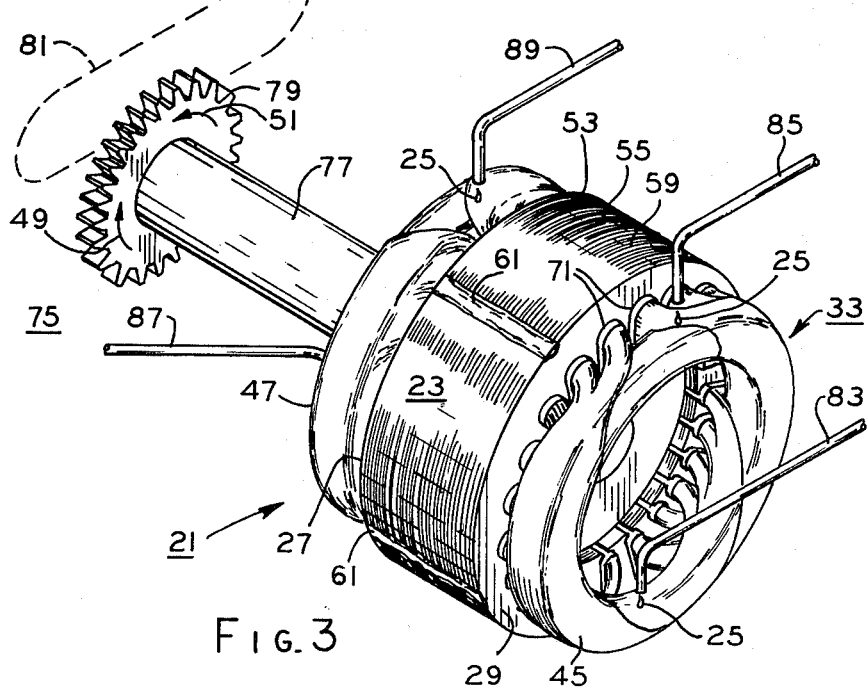
FIG. 3 is an enlarged isometric view showing the core at the dispensing station of FIG. 2 mounted to a rotatable mandrel and associated with a pair of sets of means for dispensing the liquid adhesive material onto a pair of opposite end turn portions of the winding means carried by the core.
Figure 4:
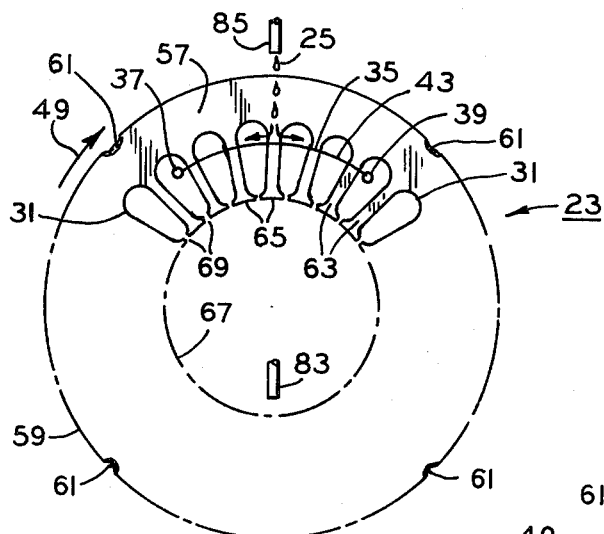
FIGS. 4, 5 and 6 are schematic end views of the core of FIG. 3 illustrating during one revolution thereof the flow of liquid adhesive material dispensed onto an opposite end turn portion of a coil of the winding means into slot means of the core in which a pair of opposite side turn portions of the coil connected with the opposite end turn portion thereof are received, respectively.
Figure 5:
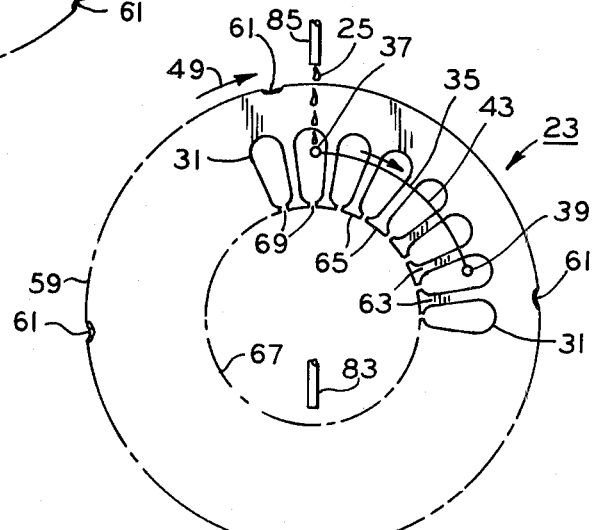
Figure 6:
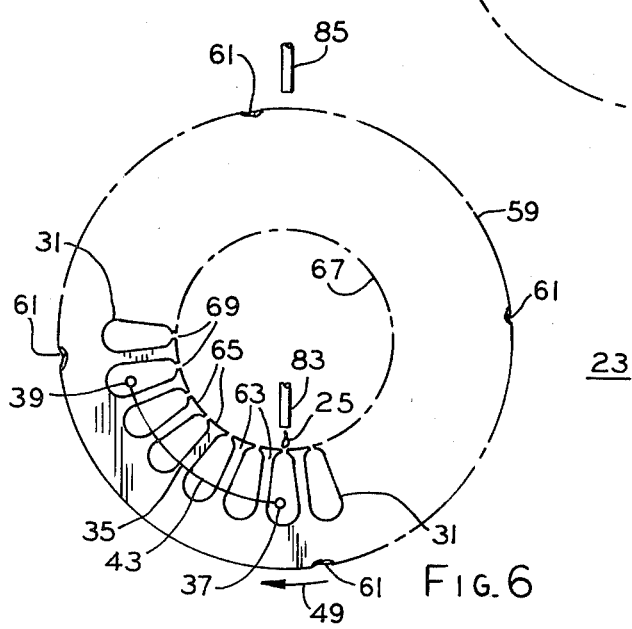
Figure 7:
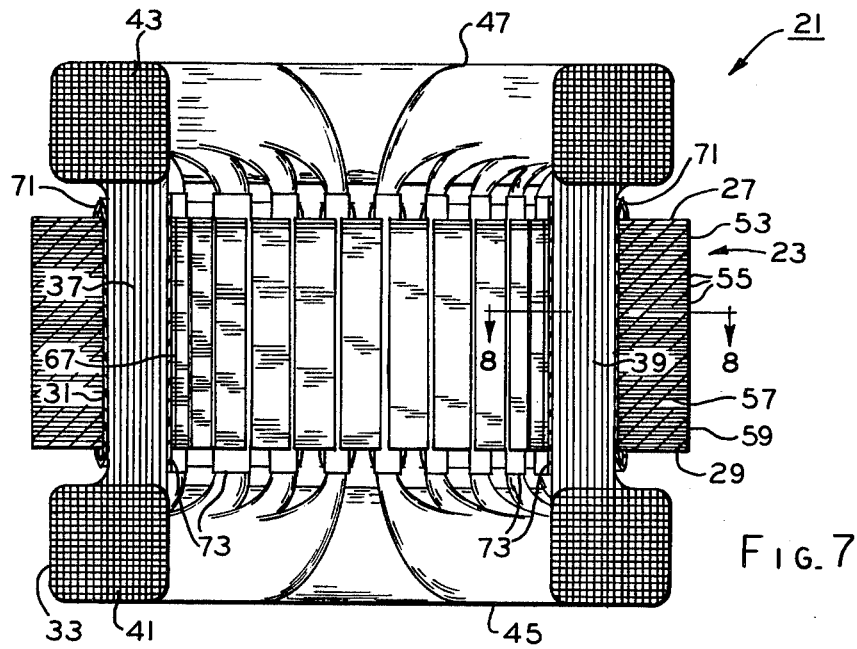
FIG. 7 is a section view taken along line 7—7 of FIG. 3.

With reference to the drawings in general, there is illustrated in one form of the invention a method of treating winding means 21 of a dynamoelectric machine core, such as a stator 23 or the like for instance, with a liquid adhesive material 25 (FIGS. 1–10). Core or stator 23 includes a pair of opposite end faces 27, 29 and a plurality of slot means 31 extending between the opposite end faces and intersecting therewith for receiving winding means 21 (FIG. 7). Winding means 21 includes a plurality of sets of coils 33, each coil having at least one conductor turn 35 with opposite side turn portions 37, 39 of the coils received in slot means 31 of stator 23 and with opposite end turn portions 41, 43 of the coils arranged generally in groupings 45, 47 thereof adjacent opposite end faces 27, 29 of the stator, respectively (FIG. 7). In practicing this method, stator 23 is rotated in one direction, as indicated by a directional arrow 49 (FIGS. 3–6). Liquid adhesive material 25 is dispensed or fed, such as by dripping or trickling or the like for instance, onto opposite end turn portions 41, 43 of coils 33, and a greater amount of the liquid adhesive material is flowed or otherwise passed from the opposite end turn portions of the coils along one of the opposite side turn portions 39 of the coils into slot means 31 of stator 23 in which the one opposite side turn portions of the coils are received than generally along the other of the opposite side turn portions 37 of the coils into the slot means of the stator in which the other opposite side turn portions of the coils are received in response to the rotation of the stator in the one direction (FIGS. 4–6). The rotation of stator 23 is reversed to effect the rotation thereof in another direction, as indicated by a directional arrow 51, which is opposite the one direction indicated by directional arrow 49 (FIGS. 3–6). The dispensing of liquid adhesive material 25 onto opposite end turn portions 41, 43 of coils 33 is continued, and a greater amount of the liquid adhesive material is flowed or otherwise passed from the opposite end turn portions of the coils generally along the other opposite side turn portions 37 of the coils into slot means 31 of stator 23 in which the other opposite side turn portions 37 are received than generally along the one opposite side turn portions 39 of the coils into the slot means of the stator in which the one opposite side turn portions 39 of the coils are received in response to the rotation of the stator in the another direction indicated by directional arrow 51 thereby to generally equalize the liquid adhesive material fill of the slot means of the stator (FIGS. 3–6).

Figures 8, 10:
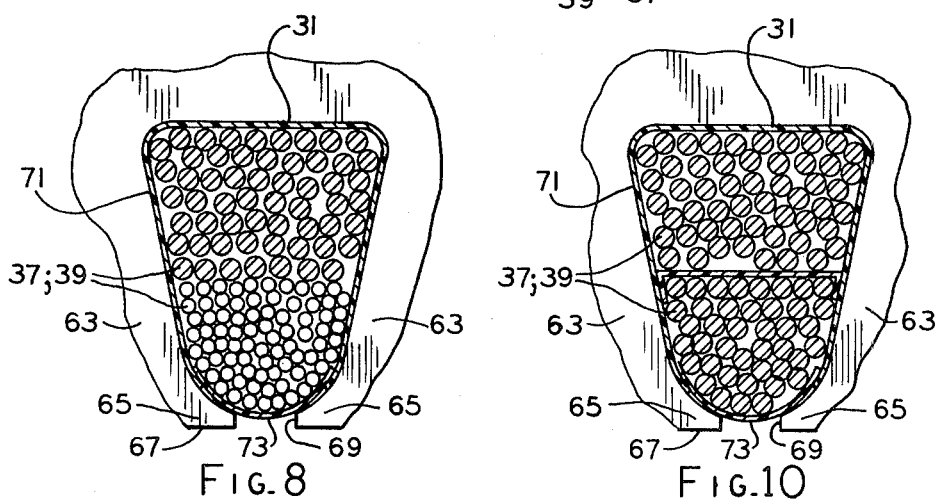
FIG. 8 is an enlarged sectional view taken along line 8—8 of FIG. 7.
FIG. 10 is an enlarged sectional view taken along line 10—10 of FIG. 9.

More particularly and with specific reference to FIGS. 3–7, stator 23 comprises a stack 53 of laminations 55 lanced or otherwise formed from a suitable material, such as a generally thin ferromagnetic sheet material or the like for instance, and arranged generally in face-to-face relation with each other so that the opposite end laminations define opposite end faces 27, 29 of the stator, respectively, as best seen in FIGS. 3 and 7. Stator 23 has a yoke section 57 with an outer peripheral or circumferential surface 59 thereof interposed between opposite end faces 27, 29 of the stator, and a plurality of welds 61 extend across the circumferential surface between the opposite end faces thereby to interconnect laminations 55 in their interfacing relation in stack 53, as best seen in FIGS. 4–7. While welds 61 are illustrated herein for purposes of disclosure, it is comtemplated that other suitable means well known to the art, such as mechanical interlocking, bonding, and keying or cleating or the like for instance, may be utilized for interconnecting the laminations in the stack thereof of the stator within the scope of the invention so as to meet at least some of the objects thereof. A plurality of generally arcuately spaced apart teeth 63 are integrally formed with yoke section 57 of stator 23 and extend generally radially inwardly therefrom so as to define slot means or slots 31 of the stator between adjacent ones of the teeth, respectively, as best seen in FIGS. 4–7 and 8. Teeth 63 have a plurality of tips 65 on the free ends thereof defining in part a bore 67 which extends generally axially through stator 23 intersecting with opposite end faces 27, 29 thereof, and a plurality of passages 69 or the like for instance are defined between adjacent ones of the teeth tips communicating between slots 31 and the bore, respectively. As best seen in FIGS. 7 and 8, a plurality of means, such as slot liners 71 or the like for instance as well known to the art, are disposed at least in part within slots 31 of stator 23 for electrically insulating opposite side turn portions 37, 39 of coils 33 from the stator, and another plurality of means, such as slot wedges 73 or the like for instance, are disposed at least in part within the slots in engagement with adjacent ones of teeth tips 65 for maintaining the opposite side turn portions of the coils against displacement from the slots through passages 69 into bore 67 of the stator, respectively. While slot liners 71 and wedges 73 are shown herein for purposes of disclosure, it is contemplated that other winding means, insulation means or systems and other winding displacement preventing means may be employed with stator 23 within the scope of the invention so as to meet at least some of the objects thereof. Further, it is also contemplated that cores having configurations and constructions different than stator 23 may also be utilized within the scope of the invention so as to meet at least some of the objects thereof.

At a work or liquid adhesive material dispensing station 75 as best seen in FIG. 3, bore 67 of stator 23 is removably secured or mounted by suitable means, such as chucking device or the like for instance (not shown), onto means, such as for instance a rotatable mandrel 77 or the like, selectively operable for effecting the conjoint rotation therewith of the stator in opposite directions, as indicated by directional or rotational arrows 49, 51, respectively. When so removably mounted or chucked on mandrel 77, stator 23 is disposed in a preselected position or attitude with the centerline axis of bore 67 extending generally in a generally horizontal plane (not shown). Albeit not shown, it is contemplated that the centerline axis of bore 67 in stator 23 may be slightly angularly positioned with respect to the aforementioned horizontal plane within the scope of the invention so as to meet at least some of the objects thereof. Means for driving mandrel 77 to effect the conjoint rotation thereof with stator 23 in both clockwise and counterclockwise directions, as indicated by rotational arrows 49, 51, includes a sprocket 79 secured to the mandrel and arranged in driven relation with an endless chain drive, as illustrated schematically in dotted outline at 81. While suitable motive means may be associated for selective operation with endless chain drive 81 in a manner well known to the art so as to effect the driving operation of the endless chain, such motive means is not shown for purposes of drawing simplicity. Further, while the above discussed driving means or sprocket and endless chain drive 79, 81 for selectively effecting the rotation of mandrel 77 in the opposite directions of rotational arrows 49, 51 is illustrated herein for purposes of disclosure, it is contemplated that other means may be associated with the mandrel to effect its selective rotation in the opposite directions within the scope of the invention so as to meet at least some of the objects thereof. At least winding means 21 of stator 23 may be preheated, as discussed in greater detail hereinafter, prior to the treatment thereof with liquid adhesive material although it is contemplated that such preheating may be omitted within the scope of the invention so as to meet at least some of the objects thereof.

A pair of sets of means, such as nozzles 83, 85 and 87, 89 or the like for instance, are provided for dispensing liquid adhesive material 25 onto opposite end turn portions 41, 43 of coils 33 in the generally annular groupings 45, 47 thereof, respectively. When stator 23 is conjointly rotated with mandrel 77 at work station 75, dispensing means or nozzles 83, 85, 87, 89 may be adjustably moved by suitable means (not shown) as may be well known to the art into preselected positions or locations with respect to opposite end turn portions 41, 43 of coils 33 on stator 23, as illustrated in FIG. 3 and as shown generally by a functional diagram box 91 in FIG. 1. In such preselected positions, nozzles 83, 87 are disposed adjacent the inner circumferential surface or section of opposite end turn portions 41, 43 of coils 33 in the opposite annular groupings 45, 47 thereof so as to be generally axially spaced adjacent opposite end faces 27, 29 of stator 23, and nozzles 85, 89 are disposed adjacent the outer circumferential surface or section of the opposite end turn portions of the coils in the opposite annular groupings thereof so as to be axially spaced generally between the opposite free ends of such groupings and the opposite end faces of the stator, respectively. While these preselected positions of nozzles 83, 85, 87, 89 for dispensing liquid adhesive material 25 onto opposite end turn portions 41, 43 of coils 33 in the opposite annular groupings 45, 47 thereof are illustrated herein for the purposes of disclosure, it is contemplated that such nozzles may be located at various other preselected positions with respect to the opposite end turn portions of the coils in the opposite annular groupings thereof within the scope of the invention so as to meet at least some of the objects thereof. While liquid adhesive material 25 hereof for purposes of disclosure may be a formula Y390PS solvent base varnish (with generally between about 9% and about 38% solids) available from Sterling Division of Reichhold Chemicals, Inc., Sewickley, PA, it is comtemplated that various other liquid adhesive material, such as solvent or water based varnishes or the like for instance and having different solid contents than mentioned above, may be utilized within the scope of the invention so as to meet at least some of the objects thereof.

Figure 1:
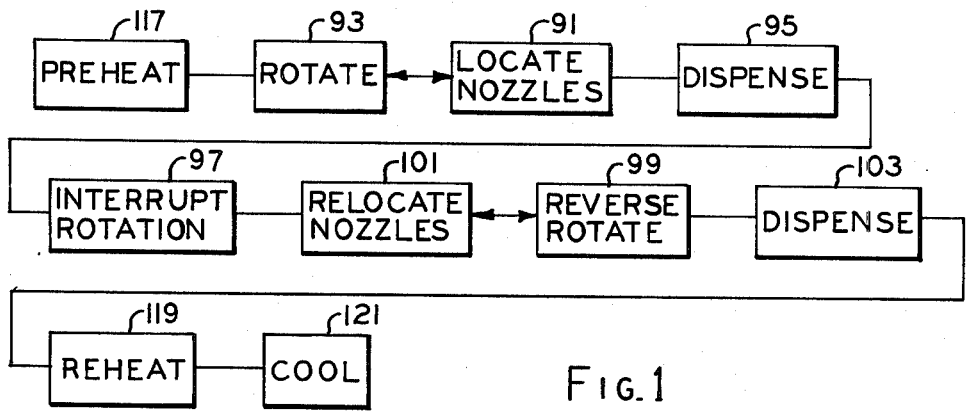
FIG. 1 is a functional box diagram illustrating a method of treating winding means of a dynamoelectric machine core with a liquid adhesive material in one form of the invention.

With nozzles 83, 85, 87, 89 so located in their preselected positions and with mandrel 77 and stator 23 being conjointly rotated in the clockwise direction of rotational arrow 49 as illustrated by functional diagram box 93 in FIG. 1, liquid adhesive material 25 is fed or dripped from the nozzles at a preselected rate of flow onto opposite end turn portions 41, 43 of coils 33 in the opposite annular groupings 45, 47 thereof as shown by functional diagram box 95 in FIG. 1, and it is contemplated that the rate of flow from such nozzles may be respectively equal or different within the scope of the invention so as to meet at least some of the objects thereof. It is also contemplated that the rotation of stator 23 in the clockwise direction may be initiated prior to the location of nozzles 83, 85, 87, 89 in their preselected positions, as indicated by the reversal arrows between boxes 91, 93 in the functional diagram of FIG. 1, within the scope of the invention so as to meet at least some of the objects thereof. In order to simplify and illustrate with clarity the following description of the flow of liquid adhesive material dispensed onto opposite end turn portions 41, 43 of coils 31, only one opposite end turn portion 43 integral with opposite side turn portions 37, 39 of one of coils 33 is schematically shown on stator 23 in association with nozzle 85 during one revolution of the stator in FIGS. 4–6, respectively. For the sake of explanation, assume that a droplet of liquid adhesive material 25 is dispensed from nozzle 85 onto the generally arcuate midsection of opposite end turn portion 43 as it is rotated with stator 23 in the clockwise direction of rotational arrow 49, as best seen in FIG. 4. The liquid adhesive material 25 applied from nozzle 85 onto the midsection of opposite end turn portion 43 would tend to flow by capillary action and gravity generally instantaneously in opposite directions (as shown by the flow arrows in FIG. 4) along the opposite end turn portion toward opposite side turn portions 37, 39 integrally formed therewith if the stator was not being rotated in the clockwise direction. However, when stator 23 is rotated from its position in FIG. 4 through a part of one revolution thereof to the position shown in FIG. 5 for example, it may be noted that in this rotational position of the stator, opposite side turn portion 39 is disposed in a lower or "downhill" position with respect to the horizontal than opposite side turn portion 37 which is in effect "uphill" therefrom. Therefore, in response to the clockwise rotation of stator 23 and since the liquid adhesive material 25 dispensed onto opposite end turn portion 43 cannot flow therealong in an "uphill" direction, at least a greater amount of such liquid adhesive material flows or passes along the opposite end turn portion toward the lower or "downhill" opposite side turn portion 39 past opposite end face 29 of stator 23 and into the slot 31 thereof in which the "downhill" opposite side turn portion 39 is received. Since the aforementioned at least greater amount of liquid adhesive material 25 dispensed onto opposite end turn portion 43 is flowed into the stator slot 31 in which "downhill" opposite side turn portion 39 is received, it may be noted that such stator slot becomes generally filled with the liquid adhesive material flowed thereinto during the rotation of stator 23 in the clockwise direction while only a lesser amount of the liquid adhesive material may be flowed into the slot 31 in which "uphill" opposite side turn portion 37 is received thereby to, in effect, starve the stator slot in which "uphill" opposite side turn portion 37 is received. When stator 23 is rotated further through another part of one revolution thereof, as shown in FIG. 6 for instance, "uphill" opposite end turn portion 37 eventually attains a "downhill" position with respect to opposite end turn portion 39. However, since the aforementioned greater amount of liquid adhesive material 25 dispensed onto opposite end turn portion 43 has been flowed into the stator slot in which "downhill" opposite side turn portion 39 is received, as discussed above, only a lesser amount, if any, of the liquid adhesive material remains available for flowing from the opposite end turn portion into the stator slot 31 in which "uphill" opposite side turn portion 37 is received even when "uphill" opposite side turn portion 37 is rotated into the "downhill" position with respect to "downhill" opposite side turn portion 39, as shown in FIG. 6. In view of the foregoing, it is believed that only slots 31 of stator 23 in which "downhill" opposite side turn portions 39 of coils 33 are received become generally filled with liquid adhesive material 25 flowed thereinto during the rotation of the stator in the clockwise direction of directional arrow 49 while the slots in which "uphill" opposite side turn portions 37 of the coils are received are generally starved, i.e., only partially filled with the liquid adhesive material, as discussed above.

While the foregoing explanation of the flow of liquid adhesive material 25 applied to winding means 21 of stator 23 is discussed in terms of only one conductor turn of coils 33, it is, of course, apparent that such coils each have a plurality of opposite side turn portions 37, 39 within slots 31 of the stator and opposite end turn portions 41, 43 in annular groupings 45, 47 thereof adjacent opposite end faces 27, 29 of the stator. Therefore, it may be noted that the flow of liquid adhesive material 25 discussed hereinabove with respect to only one opposite end turn portion 39 and opposite side turn portions 41, 43 connected therewith is applicable to generally all of such opposite end turn portions and side turn portions of winding means 21 when stator 23 is rotated in the clockwise direction of rotational arrow 49. It may also be noted that liquid adhesive material 25 fed by nozzle 89 onto opposite end turn portions 37 of annular grouping 45 flows therefrom generally along opposite side turn portions 37, 39 of coils 33 connected therewith to effect generally the filling of the same slots 31 of stator 33 in which the "downhill" opposite side turn portions 43 of the coils are received while in effect starving the same slots in which the "uphill" opposite side turn portions of the coils are received in the same manner as discussed hereinabove with respect to opposite end turn portions 43 of the coils. Since coils 33 comprise a plurality of opposite side turn portions 37, 39 and opposite end turn portions 41, 43 are previously mentioned, interstices are, of course, defined therebetween, and it may be noted that such interstices between the "downhill" opposite side turn portions 39 of the coils are generally filled or saturated with liquid adhesive material 25 upon the filling therewith of slots 31 in stator 23 in which the "downhill" opposite side turn portions 39 of the coils are received during the rotation of the stator in the clockwise direction of rotational arrow 49, as discussed hereinabove. Furthermore, it may also be noted that some of the liquid adhesive material dripped from nozzles 85, 89 onto opposite end turn portions 41, 43 of coils 33 in annular groupings 45, 47 thereof remains in the interstices defined between the opposite end turn portions of the coils. Albeit not previously discussed, it may be noted that liquid adhesive material 25 dispensed by nozzles 83, 87 onto the inner circumferential surface or section of opposite end turn portions 41, 43 of coils 33 flows therefrom generally in the same manner as previously described with respect to the liquid adhesive material fed by nozzles 85, 87 onto the outer cirumferential surface of the opposite end turn portions of the coils. During the rotation of stator 23 in the clockwise direction of rotational arrow 49 and the counterclockwise direction of rotational arrow 51, as discussed in greater detail below, the rotational speed of the stator may be preselected within a range of a maximum rotational speed or high value at which centrifugal displacement of liquid adhesive material 25 applied to winding means 21 of the stator is generally obviated and a minimum rotational speed or low value great enough to generally prevent dripping from the winding means of the liquid adhesive material applied thereto.

When stator 23 and mandrel 77 have been conjointly rotated by endless chain drive 81 in the clockwise direction of rotational arrow 49 for a preselected period of time at least great enough to effect generally the filling of slots 31 of the stator in which the "downhill" opposite side turn portions 39 of coils 33 are received, such clockwise rotation is terminated, as illustrated by functional diagram box 97 in FIG. 1, and the endless chain drive is reversed thereby to effect reverse conjoint rotation of the stator and mandrel in the counterclockwise direction of rotational arrow 51 as illustrated by functional diagram box 99 in FIG. 1. Either before or after the reverse rotation of stator 23 is effected, at least one of nozzles 83, 85, 87, 89 may, if desired, be relocated in another preselected position with respect to winding means 21 of the stator, as illustrated by functional diagram box 101 in FIG. 1 and the reversal arrows between functional diagram boxes 99, 101, within the scope of the invention so as to meet at least some of the objects thereof. In response to this reverse or counterclockwise rotation of stator 23, opposite side turn portions 37 of coils 33 now become the "downhill" opposite side turn portions with respect to liquid adhesive material 25 fed onto opposite end turn portions 41, 43 and flowed thereto with opposite side turn portions 39 now becoming the "uphill" opposite side turn portions, as best seen in FIGS. 4–6. During rotation of stator 23 in the counterclockwise direction of rotational arrow 51, liquid adhesive material 25 is continued to be fed by nozzles 83, 87 and 85, 89 onto opposite end turn portions 41, 43 of coils 33 with at least a greater amount of such fed liquid adhesive material flowing therefrom along the "downhill" opposite side turn portions 37 of the coils so as to generally fill slots 31 of the stator in which the "downhill" opposite side turn portions 37 are received while in effect starving the slots of the stator in which the "uphill" opposite side turn portions 39 of the coils are received in the same manner as discussed hereinabove and as illustrated in functional diagram box 103 in FIG. 1. It may be noted that slots 31 of stator 23 in which "downhill" opposite side turn portions 37 of coils 33 are received so as to be generally filled with liquid adhesive material 25 during the counterclockwise rotation of the stator are the same slots which were in effect starved of such liquid adhesive material during the previously discussed clockwise rotation of the stator. Of course, the interstices between the "downhill" opposite side turn portions 39 of coils 33 become generally filled or saturated with the liquid adhesive material upon the filling therewith of slots 31 of stator 23 in which the "downhill" opposite side turn portions 39 of the coils are received during the counterclockwise rotation of the stator. Liquid adhesive material 25 may be continued to be dispensed onto the opposite end turn portions 41, 43 of coils 33 for a preselected period of time during the counterclockwise rotation of stator 23 to generally fill or saturate the interstices between the opposite end turn portions of the coils, and when a preselected amount of such liquid adhesive material has been applied to winding means 21 of stator 23 during both the clockwise and counterclockwise rotations of the stator, the counterclockwise rotation thereof is terminated along with the dispensing of the liquid adhesive material. In view of the foregoing, it may be noted that the feeding of liquid adhesive material 25 from nozzles 83, 85, 87, 89 onto opposite end turns 41, 43 of coils 33 during the rotation of the stator in both the clockwise and counterclockwise rotation thereof generally ensures the equalization of fill of all of slots 31 of the stator with the liquid adhesive material as well as the encapsulation or saturation of the opposite end turn portions and opposite side turn portions 37, 39 of winding means 21 with the liquid adhesive material.

An apparatus 105 for effecting the above discussed treating method for a plurality of stators 23 is illustrated schematically in FIG. 2 and comprises at least a preheating work station or section 107, dispensing work station or section 75, and a reheating work station or section 109. In apparatus 105, a plurality of the mandrels 77 are rotatably associated or mounted in spaced apart relation to a conveyor, such as for instance another endless chain drive or the like illustrated generally at 111, which is driven by suitable means well known to the art (not shown) and operable generally for progressively indexing the mandrels so as to carry stators 23 mounted thereto through work stations 107, 75, 109 of the apparatus. A set of heating devices, such as electrical heating elements or infrared heating elements 113, 115 or the like for instance connected across a power source L1, L2, are provided in preheating and reheating work stations 107, 109 for heating stators 23 and winding means 21 thereof at least to preselected temperatures or within preselected temperature ranges during their passage through the work stations, respectively; however, while the heating elements are illustrated herein for purposes of disclosure, it is contemplated that other means well known to the art may be employed for effecting such heating of the stators within the scope of the invention so as to meet at least some of the objects thereof. For instance, it is comtemplated that heating means which are electrically connected to winding means 21 of stators 23 may be utilized to effect the heating of the winding means primarily without regard to heating of the stator during the passage thereof through work stations 107, 109, respectively. Preheating of winding means 21 of stators 23 at work station 107, as illustrated by functional box diagram 117, is believed to be desirable to enhance the dispersion of liquid adhesive material through the winding means, i.e., by effectively reducing the viscosity of the liquid adhesive material, when the liquid adhesive material is dripped onto the preheated opposite end turn portions 37, 39 of the winding means at work station 75, as previously discussed. While endless chain drive 81 has been previously discussed as being reversible to effect the conjoint rotation of mandrel 77 and stator 23 in the opposite directions of rotational arrows 49, 51, work station 75 of apparatus 105 is provided with a pair of such endless chain drives 81, 81a which are dirven in opposite directions for driving engagement with sprocket 79 of the mandrels as the mandrels are indexed through work station 75 thereby to effect the conjoint rotation of the mandrels and the stators in the opposite clockwise and counterclockwise directions, respectively, as previously discussed. Reheating of winding means 21 of stators 23 at work station 109, as illustrated in functional diagram box 119, is believed to be desirable to effect gelling and curing of liquid adhesive material 25 applied to such winding means at dispensing work station 75, and when mandrel 77 with the stator thereon passes from work station 109, cooling of such stator is effected, as illustrated by functional diagram box 121 in FIG. 1. While work stations 107, 75, 109 of apparatus 105 are illustrated herein for purposes of disclosure, it is comtemplated that such apparatus may be provided with other work stations or sections, such as for instance, a cooling working station to regulate the cool down of the stators after the reheating thereof and also a station where stators are loaded onto mandrels 77 and unloaded therefrom. Further, although apparatus 105 is illustrated herein for purposes of disclosure, it is contemplated that other apparatus may be utilized having only work station 75 for instance with the above discussed preheating and/or reheating of the stator being accomplished at such work station within the scope of the invention so as to meet at least some of the objects thereof. Upon the curing of liquid adhesive material 25 dispensed onto winding means 21 of stator 23, it is believed that a more uniform and stronger bond is effected between opposite side turn portions 37, 39 and opposite end turn portions 41, 43 of the winding means due to improved webbing or filleting of the liquid adhesive material upon the curing thereof within the interstices between the opposite side turn portions and opposite end turn portions of the winding means thereby to achieve such more uniform and stronger bond. For instance and as previously mentioned when liquid adhesive material 25 is in its fluid or liquid state the liquid adhesive material generally fills all slots 31 in the stator in response to the clockwise and counterclockwise rotation thereof thereby to effect the generally complete encapsulation and saturation by the liquid adhesive material of the opposite side turn portions and the opposite end turn portions as well as the generally complete fill of the interstices therebetween. Thus, when liquid adhesive material 25 is cured, it webbs or fillets generally completely within the interstices of winding means 21. If a more detailed description of the components and operation of apparatus 105 is desired reference may be had to the aforementioned commonly assigned application Ser. No. 563,766 filed concurrently herewith. Furthermore, while the foregoing discussion has been concerned with the method of treating of winding means 21 of stator 23 with liquid adhesive material, for the purposes of disclosure, it is contemplated that such method of treatment and apparatus for effecting such may be utilized in treating the winding means of other electrical components, such as for instance the winding means of a wound inside out stator or core or a wound rotor or core for a dynamoelectric machine or the like, within the scope of the invention so as to meet at least some of the objects thereof.

Figure 9:
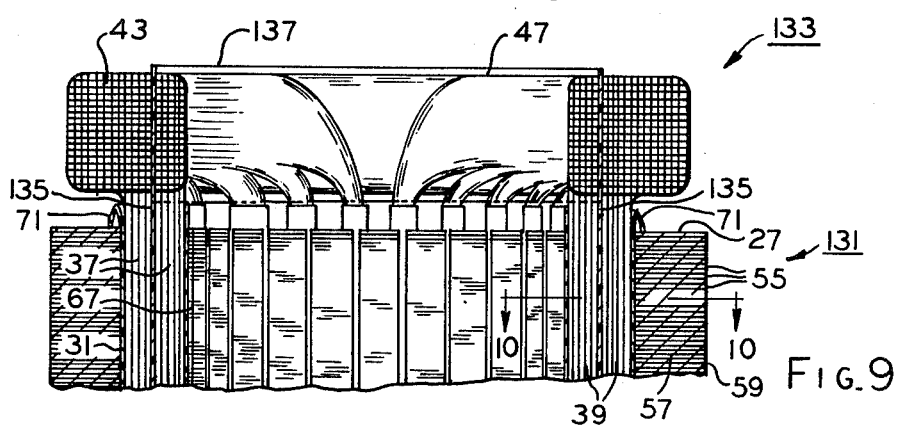
FIG. 9 is generally the same as FIG. 7 showing phase insulation between phase coils of the winding means.

With reference to FIGS. 9 and 10, there is shown another core, such as a stator 131 or the like for instance, having generally the same component parts and treated by generally the same method as discussed hereinabove with respect to stator 23 with the exceptions noted below.

Coils 33 of winding means 21 in stator 131 are distributed or otherwise arranged in different winding phases or phase relations with each other, as is well known in the art. A plurality of phase insulators or phase insulation means, indicated generally at 133, are of a construction well known to the art and are disposed for insulating between coils 33 in the different winding phases thereof in stator 131. Phase insulation means 133 includes a plurality of generally elongate pieces 135 disposed in slots 31 of stator 131 in phase insulating relation between opposite side turn portions 37, 39 of coils 33 in the different winding phases thereof, respectively, and a pair of opposite end pieces 137 are integrally formed or otherwise connected with the opposite ends of the elongate pieces with such opposite end pieces being disposed in phase insulating relation between opposite end turn portions 41, 43 of the coils in the different winding phases thereof, respectively; however, for the sake of drawing simplicity, only one such opposite end piece 137 is shown in FIG. 9 secured to the elongate pieces 135. Even with phase insulation means 133 in place between coils 33 in the different winding phases thereof in stator 131, stator 131 may be treated with liquid adhesive material 25 in the same treating method discussed hereinabove with respect to stator 31, and when so treated, it may be noted that slots 31 of stator 131 are generally equally filled with the liquid adhesive material due to the rotation of stator 131 in both the clockwise and counterclockwise rotations. Further, it may also be noted both elongate pieces 135 of phase insulation means 133 and opposite side turn portions 37, 39 of coils 33 in the different phase relations thereof in slots 33 are generally encapsulated by liquid adhesive material 25 and that opposite end pieces 137 and opposite end turn portions 41, 43 in annular groupings thereof are also generally encapsulated by the liquid adhesive material.

Figure 11:
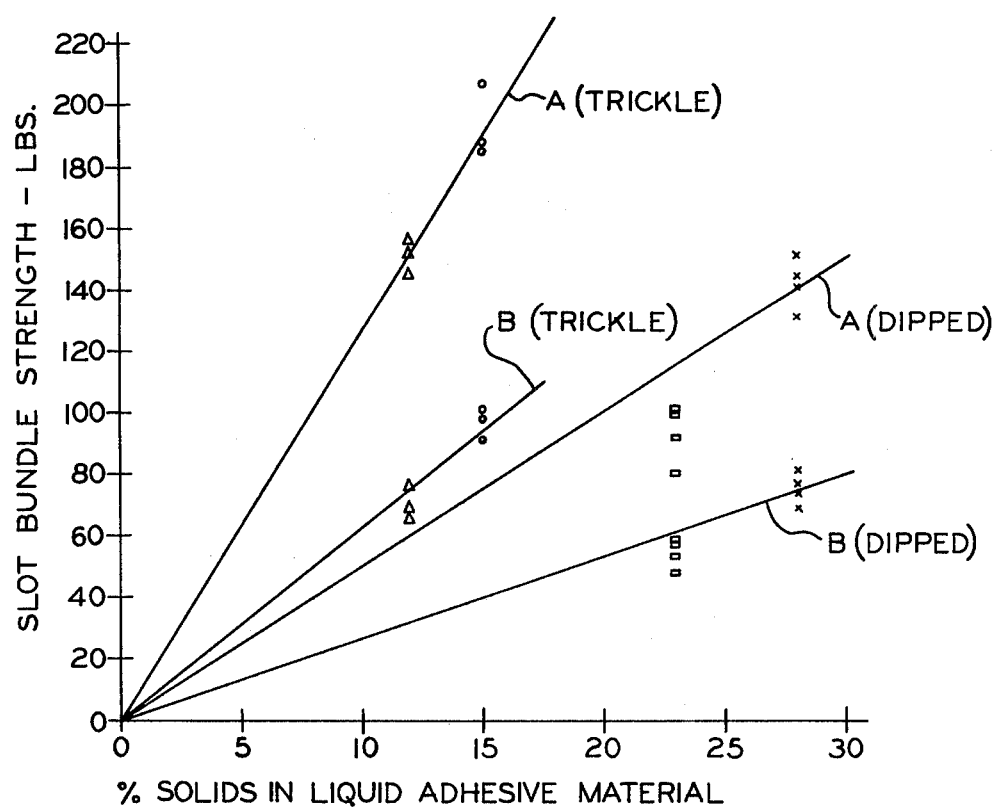
FIG. 11 is a graphical representation illustrating strengths of slot bundles of opposite side turn portions of the winding means in preselected slots of the stator when treated by the method of this invention and by the prior art method of dipping the stator in a bath of liquid adhesive material.

The graphical representation in FIG. 11 illustrates the improvement achieved in slot bundle strength for production stators by utilizing the method of this invention to bond three phase stators as compared with the prior art method of dipping the same three phase stators in a bath of liquid adhesive material. For instance and referring to the lines designated A (trickle), B (trickle), A (dipped) and B (dipped) in the graph of FIG. 11, the strength of a plurality of slot bundles A (trickle) and B (trickle), i.e., opposite side turn portions 37, 39 of winding means 21 in preselected ones of slots 31 in stator 23, treated in accordance with the method of this invention are compared with the same plurality of slot bundles A (dipped) and B (dipped) treated by fully dipping the stator in a bath of the liquid adhesive material. Even though the liquid adhesive material utilized in the method of this invention has a resin or solid content appreciably less than that of the bath in which the stators were dipped, it may be noted tht the strengths of slot bundles A (trickle) and B (trickle) treated in accordance with the method of this invention are improved over the slot bundles A (dipped) and B (dipped), and it is believed that such increased bundle strength is achieved in response to the more complete and uniform filling of slots 31 of stator 23 with the liquid adhesive material as well as the improved webbing of the liquid adhesive material within the interstices of winding means 21 of the stator, as discussed hereinbefore.

With respect to a three phase stator treated by trickling liquid adhesive material onto the opposite end turn portions of the winding means while rotating the stator in only one direction, it was found that at least some of the slot bundles of the middle phase of the winding means were inadequately bonded, i.e., fell apart when removed from the stator to be tested in the manner discussed hereinafter. However, as previously mentioned, the same slot bundles of the middle phase of the winding means of the same three phase stator were adequately bonded together when treated in accordance with the method of this invention with the liquid resin material being trickled onto the opposite end turn portions of the winding means while rotating the stator in both one direction and another direction opposite thereto, respectively. Of course, it is believed that the increased strength of the slot bundles in the middle phase of the winding means in the stator treated by the method of this invention was achieved in response to the rotation of the stator in opposite directions so as to attain a more complete and uniform filling of the stator slots with the liquid adhesive material as well as the improved webbing of the liquid adhesive material within the interstices of the winding means, as discussed hereinabove.

In comparing the strengths of the same slot bundles of winding means in stators treated by the method of this invention and by the prior art method in which the liquid adhesive material was trickled onto the opposite end turns of the winding means while the stator was rotated in only one direction, it was found that the strengths of at least some of the slot bundles were increased by utilizing the method of this invention. Of course, it is believed that this increased bundle strength was achieved in response to more complete and uniform filling of the stator slots with the liquid adhesive material as well as the improved webbing thereof within the interstices of the winding means, as discussed hereinbefore.

In order to insure satisfactory comparisons in the aforementioned testing of slot bundles, only the bundles of opposite side turn portions of the winding means in slots of the stator which were not shared were tested. To effect the aforementioned testing of the slot bundles, they were first severed from the opposite end turn portions of the winding means and then removed from the slots of the stators. Each slot bundle was then seated across a pair of knife-edged supports therefor spaced four inches apart on a standard bench press which was operable to apply a generally perpendicular force onto the midsection of the slot bundle until at least one of the opposite side turn portions of the winding means in such slot bundle separated from the others. Suitable measuring equipment associated with the bench press measured the force applied to the slot bundle to either effect the separation of at least one of the opposite side turn portions of the winding means in such slot bundle from the other of the opposite side turn portions of the winding means contained in such slot bundle or the yielding of the entire slot bundle.

From the foregoing, it is apparent that a novel method of treating winding means of a dynamoelectric machine core has been presented meeting the objects and advantageous features set out hereinbefore, as well as others, and it is contemplated that changes as to the precise arrangements, shapes, details and connections of the components associated with such method, as well as the precise steps thereof, may be made by those having ordinary skill in the art without departing from the spirit thereof or the scope of the invention as defined by the claims which follow.

What we claim as new and desire to secure by Letters Patent of the United States is:

1. A method of treating winding means of a dynamoelectric machine core with a liquid adhesive material, the core including a pair of opposite end faces, a bore extending generally axially through the core and intersecting with the opposite end faces of the core, and a plurality of slot means intersecting with both the bore and the opposite end faces of the core for receiving the winding means, respectively, the winding means including a plurality of sets of coils, each coil having at least one conductor turn with opposite side turn portions of the coils received in the slot means of the core and with opposite end turn portions of the coils arranged in generally annular groupings about the bore adjacent the opposite end faces of the core, respectively, the method comprising the steps of:

preheating at least the winding means associated with the core to at least a preselected temperature;

rotating the core in one direction at a speed generally between a preselected low value and a preselected high value;

feeding the liquid adhesive material onto the opposite end turn portions of the coils generally at a preselected rate of flow to generally obviate dripping of the liquid adhesive material from the opposite end turn portions of the coil when the rotational speed of the core is generally about the preselected low value thereof and to generally obviate centrifugal displacement of the liquid adhesive material from the opposite end turn portions of the coil when the rotational speed of the core is generally about the preselected high value thereof;

retaining in the opposite end turn portions of the coils a part of the liquid adhesive material fed thereto during the feeding step and flowing another part of the liquid adhesive material from the opposite end turn portions of the coils generally along the opposite side turn portions of the coils into the slot means of the core in which the opposite side turn portions of the coils are received thereby to at least in part fill the slot means in which the one opposite side turn portions of the coils are received with the liquid adhesive material fed thereinto while at least generally impeding the fill of the slot means of the core in which the other of the opposite side turn portions of the coils are received with the liquid adhesive material when the core is being rotated in the one direction;

interrupting the feeding of the liquid adhesive material onto the opposite side turn portions of the coils at least when a preselected volume of the liquid adhesive material has been fed thereto during the rotation of the core in the one direction;

terminating the rotation of the core in the one direction;

reestablishing the rotation of the core in another direction opposite the one direction at a speed generally between the preselected low and high values thereof;

repeating the feeding step while the core is being rotated in the another direction;

flowing the liquid adhesive material from the opposite end turn portions of the coils generally along the opposite side turn portions of the coils into the slot means of the core in which the side turn portions of the coils are received and filling at least in part the slot means in which the other opposite side turn portions of the coils are received with the liquid adhesive material fed thereinto while at least generally impeding the fill of the slot means of the core in which the one opposite side turn portions of the coils are received with the liquid adhesive material when the core is being rotated in the another direction thereby to generally equalize the liquid adhesive material fill of the slot means of the core;

ceasing the feeding of the liquid adhesive material onto the opposite end turn portions of the coils at least when another preselected volume of the liquid adhesive material has been fed thereto during the rotation of the core in the another direction and supplementing thereby the first named preselected volume of the liquid adhesive material fed onto the opposite end turn portions of the coils during the rotation of the core in the one direction so as to at least generally saturate the winding means with the liquid adhesive material; and heating further at least the winding means associated with the core to effect the gel and cure of the liquid adhesive material.

2. A method of treating winding means of a dynamoelectric machine core with a liquid adhesive material, the core including a pair of opposite end faces, and a plurality of slot means extending between the opposite end faces and intersecting therewith for receiving the winding means, respectively, the winding means including a plurality of sets of coils, each coil having at least one conductor turn spanning a preselected number of the slot means with opposite side turn portions of the coils received in the slot means and with opposite end turn portions of the coils arranged generally adjacent the opposite end faces of the core, respectively, the method comprising the steps of:

rotating the core in one direction;

dispensing the liquid adhesive material onto the opposite end turn portions of the coils at least when the core is rotated in the one direction;

flowing at least some of the liquid adhesive material dispensed onto the opposite end portions of the coils therefrom generally along the opposite side turn portions of the coils past the opposite end faces of the core into the slot means thereof in which the opposite side turn portions of the coils are received and filling at least in part the slot means in which one of the opposite side turn portions of the coils are received as well as the interstices between the one opposite side turn portions of the coils received therein with the liquid adhesive material while at least generally limiting the flow of the liquid adhesive material along the other of the opposite side turn portions of the coils into the slot means in which the other opposite side turn portions are received when the core is rotated in the one direction;

reversing the rotation of the core to effect its rotation in another direction opposite the one direction;

feeding the liquid adhesive material onto the opposite end turns of the coils at least when the core is rotated in the another direction; and passing of the liquid adhesive material from the opposite end turn portions of the coils generally along the opposite side turn portions of the coils past the opposite end faces of the core into the slot means thereof in which the opposite side turn portions of the coils are received and filling at least in part the slot means in which the other opposite side turn portions of the coils are received as well as the interstices between the other opposite side turn portions of the coils received therein with the liquid adhesive material while at least generally limiting the flow of the liquid adhesive material along the one opposite side turn portions of the coils into the slot means of the core in which the one opposite side turn portions of the coils are received when the stator is rotated in the another direction.

3. The method as set forth in claim 2 comprising the intermediate step of interrupting the dispensing of the liquid adhesive material onto the opposite end turn portions of the coils prior to the reversing step.

4. The method as set forth in claim 3 wherein the feeding step includes reestablishing the dispensing of the liquid adhesive material onto the opposite end turn portions of the coils subsequent to the reversing step.

5. The method as set forth in claim 2 wherein the flowing and filling step includes retaining a part of the liquid adhesive material dispensed onto the opposite end turn portions of the coils at least within the interstices of the opposite end turn portions of the coil means.

6. The method as set forth in claim 5 wherein the passing and filling step includes containing another part of the liquid adhesive material fed onto the opposite end turn portions of the coils at least within the interstices of the opposite end turn portions of the coils and supplementing thereby the part of the liquid adhesive material retained at least in the interstices of the opposite end turn portions of the coils during the retaining step thereby to generally saturate the winding means with the liquid adhesive material.

7. A method of treating winding means of a dynamoelectric machine core with a liquid adhesive material, the core including a pair of opposite end faces, and a plurality of slot means extending between the opposite end faces and intersecting therewith for receiving the winding means, respectively, the winding means including a plurality of sets of coils, each coil having at least one conductor turn with opposite side turn portions of the coils received in the slot means of the core and with opposite end turn portions of the coils arranged generally adjacent the opposite end faces of the stator, respectively, the method comprising the steps of:

rotating the core in one direction;

dispensing the liquid adhesive material onto the opposite end turn portions of the coils and flowing a greater amount of the liquid adhesive material from the opposite end turn portions of the coils generally along one of the opposite side turn portions of the coils into the slot means of the core in which the one opposite side turn portions are received than generally along the other of the opposite side turn portions of the coils into the slot means of the core in which the other opposite side turn portions of the coils are received in response to the rotation of the core in the one direction;

reversing the rotation of the core to effect the rotation thereof in another direction opposite the one direction; and continuing the dispensing of the liquid adhesive material onto the opposite end turn portions of the coils and flowing a greater amount of the liquid adhesive material from the opposite end turn portions of the coils generally along the other opposite side turn portions of the coils into the slot means of the core in which the other opposite side turn portions are received than generally along the one opposite side turn portions of the coils into the slot means of the core in which the one opposite side turn portions of the coils are received in response to the rotation of the core in the another direction thereby to generally equalize the liquid adhesive material fill of the slot means of the core.

8. The method as set forth in claim 7 comprising the preliminary step of preheating at least the winding means associated with the core.

9. The method as set forth in claim 7 comprising the additional step of heating at least the winding means associated with the core to effect gelling and curing of the liquid adhesive material.

10. The method as set forth in claim 7 wherein the dispensing and flowing step includes generally filling the slot means of the core in which the one opposite side turn portions of the coils are received with the liquid adhesive material during the rotation of the core in the one direction, respectively.

11. The method as set forth in claim 7 wherein the continuing and flowing step includes generally filling the slot means of the core in which the other opposite side turn portions of the coils are received with the liquid adhesive material during the rotation of the stator in the another direction.

12. The method as set forth in claim 7 wherein the dispensing and flowing step includes retaining in the opposite end turn portions of the coils some of the liquid adhesive material dispensed thereto during the rotation of the core in the one direction.

13. The method as set forth in claim 12 wherein the continuing and flowing step includes containing in the opposite end turn portions of the coils a part of the liquid adhesive material to effect generally the saturation of the winding means.

14. A method of treating winding means of a dynamoelectric machine core with a liquid adhesive material, the core including a pair of opposite end faces, and a plurality of slot means in the stator intersecting with the opposite end faces thereof for receiving the winding means, respectively, the winding means including a plurality of coils distributed in different winding phases in the stator, each coil having at least one conductor turn with opposite side turn portions of the coils received in the slot means of the core and with opposite end turn portions of the coils arranged in generally annular groupings thereof generally adjacent the opposite end faces of the core, respectively, and a plurality of phase insulation means for insulating between the coils in the different winding phases thereof in the core including a pair of opposite end pieces disposed between the opposite end turn portions of the coils in the different winding phases thereof and a plurality of elongate pieces disposed in the slots of the core between the opposite side turn portions of the coils in the different winding phases thereof, respectively, the method comprising the steps of:

rotating the core in one direction;

dispensing the liquid adhesive material onto the opposite end turns of the coils at least as the core is being rotated in the one direction;

flowing from the opposite end turn portions of the coils generally along one of the opposite side turn portions of the coils into the slot means of the core in which the one opposite side turn portions of the coils are received a greater amount of the liquid adhesive material than is flowed generally along the other of the opposite side turn portions of the coils into the slot means of the core in which the other opposite side turn portions of the coils are received in response to the rotation of the core in the one direction and encapsulating generally the elongate pieces of the insulating means and the one opposite side turn portions of the coils in the slot means of the core in which the elongate pieces of the insulating means and the one opposite side turn portions of the coils are received with the liquid adhesive material flowed thereinto;

reversing the rotation of the core to effect its rotation in another direction opposite the one direction;

feeding the liquid adhesive material onto the opposite end turn portions of the coils as the core is being rotated in the another direction;

passing from the opposite end turn portions of the coils generally along the other opposite side turn portions of the coils into the slot means in the core in which the other opposite side turn portions of the coils are received a greater amount of the liquid adhesive material than is flowed generally along the one opposite side turn portions of the coils into the slot means of the core in which the one opposite side turn portions of the coils are received in response to the rotation of the core in the another direction and encapsulating generally the elongate pieces of the insulating means and the other opposite side turn portions of the coils in the slot means of the core in which the elongate pieces of the insulating material and the other opposite side turn portions of the coils are received with the liquid adhesive material flowed thereinto, respectively; and continuing the feeding of the liquid adhesive material onto the opposite end turn portions of the coils until the opposite end turn portions of the coils are at least generally saturated with the liquid adhesive material and encapsulating generally with the liquid adhesive material the opposite end turn portions of the coils and the end pieces of the insulating means disposed therebetween.

15. The method as set forth in claim 14 wherein the liquid adhesive material is applied at a plurality of sets of preselected locations onto the opposite end turn portions of the coils during the dispensing step and during the feeding step, respectively.

16. The method as set forth in claim 15 wherein one set of preselected locations is within the inner periphery of the opposite end turn portions of the coils spaced adjacent the opposite end faces of the core and another set of preselected locations is adjacent the outer periphery of the opposite end turn portion of the coils, respectively.

17. The method as set forth in claim 15 wherein at least one of the one and another sets of preselected locations at which the liquid adhesive material is applied onto the opposite end turn portions of the coils is altered during the feeding step.

18. A method of treating winding means of a dynamoelectric machine core with a liquid adhesive material, the core including a pair of opposite end faces, and a plurality of slot means intersecting with the opposite end faces for receiving the winding means, respectively, the winding means including a plurality of sets of coils, each coil having at least one conductor turn iwth opposite side turn portions of the coils received in the slot means of the core and with opposite end turn portions of the coils arranged generally adjacent the opposite end faces of the stator, respectively, the method comprising the steps of :
  rotating the core in one direction;
  dispensing the liquid adhesive material onto the opposite end turn portions of the coils during the rotation of the core in the one direction, respectively;
  flowing the liquid adhesive material dispensed onto the opposite end turn portions of the coils therefrom along the opposite side turn portions of the coils into the slot means of the core in which the opposite side turn portions of the coils are received, respectively;
  filling at least in part the slot means of the core in which one of the opposite side turn portions are received with the liquid adhesive material flowed thereinto and passing a lesser amount of the liquid adhesive material into the slot means in which the other of the opposite side turn portions of the coils are received wherein the liquid adhesive material fill thereof is limited in response to the rotation of the core in the one direction, respectively;
  reversing the rotation of the core to effect its rotation in another direction opposite the one direction;
  applying the liquid adhesive material onto the opposite end turn portions of the coils during the rotation of the core in the another direction, respectively;
  passing the liquid adhesive material applied onto the opposite end turn portions of the coils therefrom along the opposite side turn portions of the coils into the slot means of the core in which the opposite side turn portions of the coils are received during the rotation of the core in the another direction, respectively;
  filling at least in part the slot means of the core in which the other opposite side turn portions of the coils are received with the liquid adhesive material passed thereinto and flowing a lesser amount of the liquid adhesive material into the slot means in which the one opposite side turn portions of the coils are received so as to generally equalize the liquid adhesive material fill of the slot means of the core in response to the rotation of the core in the another direction; and
  continuing to apply the liquid adhesive material onto the opposite end turn portions of the coils until they become at least generally saturated with the liquid adhesive material.

19. A method of treating winding means of a dynamoelectric machine core with a liquid adhesive material at a work station, the core including a pair of opposite end faces, a bore extending generally axially through the core and intersecting with the opposite end faces, and a plurality of slot means extending generally axially through the core and intersecting with both the bore and the opposite end faces for receiving the winding means, respectively, the winding means including a plurality of sets of coils, and each coil having at least one conductor turn with opposite side turn portions of the coils received in the slot means of the core and with opposite end turn portions of the coils being arranged generally in annular groupings thereof having generally radially inner and outer circumferential surfaces disposed about the bore adjacent the opposite end faces of the core, respectively, and the work station including a pair of sets of dispensing means for the liquid adhesive material, and means supporting the stator in a preselected position at the work station and selectively operable for rotating the stator in one direction and another direction opposite to the one direction, the method comprising the steps of:
  locating at the work station one of the dispensing means of the dispensing means sets in preselected positions adjacent the inner circumferential surfaces on the opposite end turn portions of the coils and spaced adjacent the opposite end faces of the core and arranging at the work station the other of the dispensing means of the dispensing means sets in preselected positions adjacent the outer circumferential surfaces on the opposite end turn portions of the coil generally adjacent the free ends thereof, respectively;
  operating the rotating means selectively to effect the rotation of the core in the one direction at the work station;
  dripping the liquid adhesive material from the one and other dispensing means of the dispensing means sets in the preselected positions thereof onto the opposite end turn portions of the coils at the inner and outer circumferential surfaces thereof, respectively;
  flowing a greater amount of the liquid adhesive material dripped onto the opposite end turn portions of the coils therefrom generally along one of the opposite side turn portions of the coils into the slot meams of the core in which the one opposite side turn portions of the coils are received than generally along the other of the opposite side turn portions of the coils into the slot means of the core in which the other opposite side turn portions of the coils are received in response to the rotation of the core in the one direction at the work station;
  selectively reversing the operation of the rotating means to effect the rotation of the core in the another direction at the work station;
  repeating the dripping step when the core is being rotated in the another direction at the work station; and
  passing a greater amount of the liquid adhesive material dripped during the repeating step onto the opposite end turn portions of the coils therefrom generally along the other opposite side turn portions of the coils into the slot means of the core in which the other opposite side turn portions of the coils are received than generally along the one opposite side turn portions of the coils into the slot means of the core in which the one opposite side turn portions of the coils are received in response to the rotation of the core in the another direction at the work station.

20. The method as set forth in claim 19 comprising the preliminary step of preheating at least the winding means associated with the core at least to a preselected temperature.

21. The method as set forth in claim 19 comprising the additional step of heating at least the winding means associated with the core to effect the gelling and curing of the liquid adhesive material.

22. The method as set forth in claim 19 wherein the flowing step includes generally filling with the liquid adhesive material the slot means of the core in which the one opposite side turn portions of the coils are received and generally encapsulating thereby the one opposite side turn portions of the coils with the liquid adhesive material when the core is being rotated in the one direction.

23. The method as set forth in claim 19 wherein the passing step includes generally filling with the liquid adhesive material the slot means of the core in which the other opposite side turn portions of the coils are received and generally encapsulating thereby the other opposite side turn portions of the coils with the liquid adhesive material when the core is being rotated in the another direction.

24. The method as set forth in claim 19 comprising the additional step of continuing the dripping of the liquid adhesive material from the one and other dispensing means of the dispensing means sets onto the opposite end turn portions of the coils until the winding means become generally saturated with the liquid adhesive material.

25. The method as set forth in claim 19 wherein the repeating step includes altering the preselected positions of at least one of the one and other dispensing means.

* * * * *